United States Patent
Schmidt et al.

(10) Patent No.: US 7,868,745 B2
(45) Date of Patent: Jan. 11, 2011

(54) INTEGRATED PASSIVE ENTRY TRANSMITTER/RECEIVER

(75) Inventors: Robert M. Schmidt, Livonia, MI (US); Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 220 days.

(21) Appl. No.: 10/876,698

(22) Filed: Jun. 25, 2004

(65) Prior Publication Data

US 2005/0285724 A1 Dec. 29, 2005

(51) Int. Cl.
*B60R 25/10* (2006.01)

(52) U.S. Cl. ............. 340/426.16; 340/10.1; 340/825.69

(58) Field of Classification Search ............ 340/426.16, 340/5.2, 5.72, 825.71, 825.72, 426.28, 426.25, 340/5.61, 5.62, 426.13, 426.17, 429, 542, 340/10.1, 10.3, 5.21, 5.64, 426, 825.69, 825.31, 340/825.22; 307/10.3, 10.5; 455/419, 556

See application file for complete search history.

(56) References Cited

U.S. PATENT DOCUMENTS

| | | | | |
|---|---|---|---|---|
| 4,868,915 | A * | 9/1989 | Anderson et al. | 340/5.61 |
| 6,236,333 | B1 | 5/2001 | King | |
| 6,308,083 | B2 | 10/2001 | King | |
| 6,320,514 | B1 * | 11/2001 | Flick | 340/825.69 |
| 6,359,348 | B1 * | 3/2002 | King | 307/10.1 |
| 6,377,173 | B1 * | 4/2002 | Desai | 340/426.36 |
| 6,396,412 | B1 * | 5/2002 | Banas | 340/5.2 |
| 6,420,967 | B1 * | 7/2002 | Ghabra et al. | 340/447 |
| 6,525,645 | B2 * | 2/2003 | King et al. | 340/5.7 |
| 6,525,646 | B1 | 2/2003 | Bartz | |
| 6,535,107 | B1 * | 3/2003 | Bartz | 340/5.2 |
| 6,690,259 | B2 * | 2/2004 | Aslanidis et al. | 340/5.61 |
| 6,747,545 | B2 * | 6/2004 | Nowottnick et al. | 340/5.61 |
| 6,768,450 | B1 * | 7/2004 | Walters et al. | 342/357.09 |
| 6,819,229 | B2 * | 11/2004 | Ghabra et al. | 340/426.36 |
| 6,965,295 | B2 * | 11/2005 | Shimonmoto et al. | 340/5.61 |
| 6,992,568 | B2 * | 1/2006 | Perraud et al. | 340/10.3 |

(Continued)

FOREIGN PATENT DOCUMENTS

DE 198 52 223 A1 5/2000

(Continued)

OTHER PUBLICATIONS

Some Attacks Against Vehicles' Passive Entry Security Systems and Their Solutions, Ansaf Ibrahem Alrabady and Syed Masud Mahmud, Mar. 2 2003, IEEE Transactions on Vehicle Technology vol. 52, No. 2.

*Primary Examiner*—Daniel Previl
(74) *Attorney, Agent, or Firm*—MacMillan, Sobanski & Todd, LLC

(57) ABSTRACT

A portable personal convenience device carried by a person having access to a transportation vehicle is provided that includes personal convenience means for performing a non-transportation related convenience function. A passive entry device is integrated within the personal convenience means and adapted to interact with the transportation vehicle for passively gaining access thereto. The passive entry device includes a receiver for receiving an interrogating signal from an electronic control module in the transportation vehicle. A transmitter is provided for broadcasting a response signal to the electronic control module. A controller is provided for controlling the transfer of the response signal to the electronic control module in response to the interrogating signal.

17 Claims, 3 Drawing Sheets

U.S. PATENT DOCUMENTS

| | | | |
|---|---|---|---|
| 7,034,683 B2 * | 4/2006 | Ghazarian | 340/568.1 |
| 7,133,659 B2 * | 11/2006 | Zalewski et al. | 455/403 |
| 7,170,400 B2 * | 1/2007 | Cowelchuk et al. | 340/438 |
| 2001/0037174 A1 * | 11/2001 | Dickerson | 701/200 |
| 2002/0140545 A1 * | 10/2002 | Nietupski et al. | 340/5.72 |
| 2003/0043023 A1 * | 3/2003 | Perraud et al. | 340/10.1 |
| 2003/0076097 A1 * | 4/2003 | Lourens et al. | 324/260 |
| 2005/0052286 A1 * | 3/2005 | Perraud et al. | 340/825.72 |
| 2005/0122209 A1 * | 6/2005 | Black | 340/5.52 |
| 2005/0192053 A1 * | 9/2005 | Kao et al. | 455/558 |
| 2005/0248436 A1 * | 11/2005 | Hohmann et al. | 340/5.72 |

FOREIGN PATENT DOCUMENTS

| | | | |
|---|---|---|---|
| DE | 199 52 575 A1 | | 5/2001 |
| DE | 101 43 017 A1 | | 3/2003 |
| DE | 200 23 317 U1 | | 10/2003 |
| WO | WO 02/25040 | * | 3/2002 |
| WO | WO 02/25040 A1 | * | 3/2002 |
| WO | WO 03/079298 A2 | | 9/2003 |

* cited by examiner

INTEGRATED PASSIVE ENTRY TRANSMITTER/RECEIVER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general for a passive entry vehicle transmitter/receiver device, and more particularly, to a passive entry vehicle transmitter/receiver integrated within a personal portable device.

2. Description of the Related Art

Remote keyless entry (RKE) systems are well known in the automotive industry for remotely accessing vehicles without the use of a key. RKE systems may be characterized as active or passive. In an active entry system, a user must activate a switch or pushbutton on a remote transmitter in order to have a desired remote function performed, such as locking or unlocking the vehicle doors or de-latching the trunk. In contrast, a passive entry system does not require a pushbutton by a user in order to have a desired remote function performed.

In passive systems, a remote receiver and transmitter (or transceiver) is carried with the user. Such a device is often referred to as a "FOB" or a "card". The FOB is commonly carried on a key chain of the user. The FOB when prompted transmits a radio frequency (RF) signal to the a module within the vehicle for performing a variety of remote vehicle function such door lock/unlock, enabling engine start, or activating external/internal lighting. Passive entry systems include a transmitter and receiver (or transceiver) in an electronic control module disposed within the vehicle. The transceiver is in communication with one or more devices (e.g., door lock mechanism) for determining when a request for actuation of a device is initiated (e.g., lifting a door handle) by a user.

Upon sensing the actuation, the transceiver broadcasts a passive entry interrogating signal. The fob upon receiving the interrogating signal determines if the interrogating signal is valid. If it is determined a valid signal, then the fob automatically broadcasts an output signal which includes an encrypted or rolling identification code to the electronic control module. The electronic module thereafter determines the validity of the output signal and generates a signal to the device to perform an operation (e.g., the door lock mechanism to unlock the door) if the output signal is determined valid.

In performing the passive entry function, the device must be carried on the user and within a broadcasting region of the interrogation signal to allow operation of the automated feature (i.e., door unlock). It is desirable to have a device that is easily portable and commonly carried with the person at all times. As stated earlier, the fob is commonly attached to a key chain. The key chain typically includes a plurality of keys for accessing a variety of items such as the user's house, office, desks, relatives house, safety devices and the like, and the addition of the fob makes for an additional bulky item on an already overloaded key chain. In addition, the ever increasing store discount membership cards which are attachable to the key chain adds to the overloaded and bulky key chain.

Furthermore, if a user owns more than one vehicle, then multiple fobs are utilized for accessing each vehicle. If the user desires to have all vehicle keys on one key chain, then each fob is added on the single key chain which creates an over-capacitized, bulky, and awkward item to carry especially in a users pocket. Alternatively, if multiple users utilize a single vehicle, it is convenient for each user to have a set of keys to the vehicle. However, if multiple key rings are used for a single vehicle, then multiple fobs must be provided on each key chain, or a respective user would have to remember to retrieve the single fob whenever the vehicle needs to be accessed.

SUMMARY OF THE INVENTION

The present invention provides a portal device that is ordinarily carried with a user of a vehicle a majority of the time for accessing a vehicle passively. The portable device integrates a passive entry device so that remote entry may be gained to the vehicle without having to manually activate a remote keyless entry device or use a key to gain access to the locked vehicle.

In one aspect of the present invention, a portable personal convenience device carried by a person having access to a transportation vehicle is provided that includes personal convenience means for performing a non-transportation related convenience function. A passive entry device is integrated within the personal convenience means and adapted to interact with the transportation vehicle for passively gaining access thereto. The passive entry device includes a receiver for receiving an interrogating signal from an electronic control module in the transportation vehicle. A transmitter is provided for broadcasting a response signal to the electronic control module. A controller is provided for controlling the transfer of the response signal to the electronic control module in response to the interrogating signal.

DETAILED DESCRIPTION OF PREFERRED EMBODIMENTS

Figure 1:
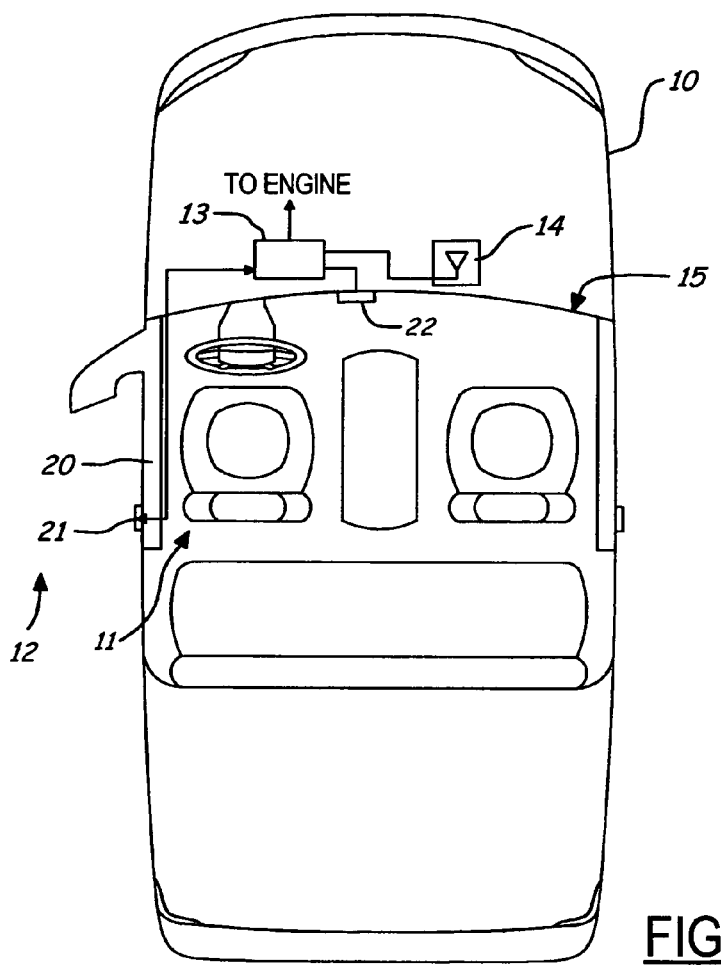
FIG. 1 is a perspective view of a vehicle incorporating a passive entry system.

Referring now to the Drawings and particularly to FIG. 1, there is shown a transportation vehicle 10 utilizing a passive entry system. The transportation vehicle 10 includes an interior portion 11. A vehicle door 20 allows access between the interior portion 11 and an exterior region 12 located outside of the transportation vehicle 10. A door handle 21 is mounted on the exterior of the transportation vehicle 10. The door handle 21 includes an activation switch 23 (FIG. 2) and a lock actuation mechanism (FIG. 2) for unlocking/locking the vehicle door 20. An electronic control module 13 is disposed within the vehicle for providing control signals for unlocking/locking the vehicle door 20. In the preferred embodiment, the electronic control module 13 is located within the vehicle instrument panel 15, however, in other preferred embodiments, the electronic control module 13 may be located elsewhere within the transportation vehicle 10. The electronic control module 13 is coupled to at least one antenna 14 for receiving and transmitting signals therefrom. The antenna may be located internal to the transportation vehicle 10 (e.g., instrument panel) or about the exterior (e.g. side view mirror).

The activation switch 23 is coupled to the door handle 21. By lifting the door handle 21, a user generates a door unlock request. The electronic control module 13 responds to the request by broadcasting an interrogating signal to a broadcast region located in the exterior region 12.

Figure 2:
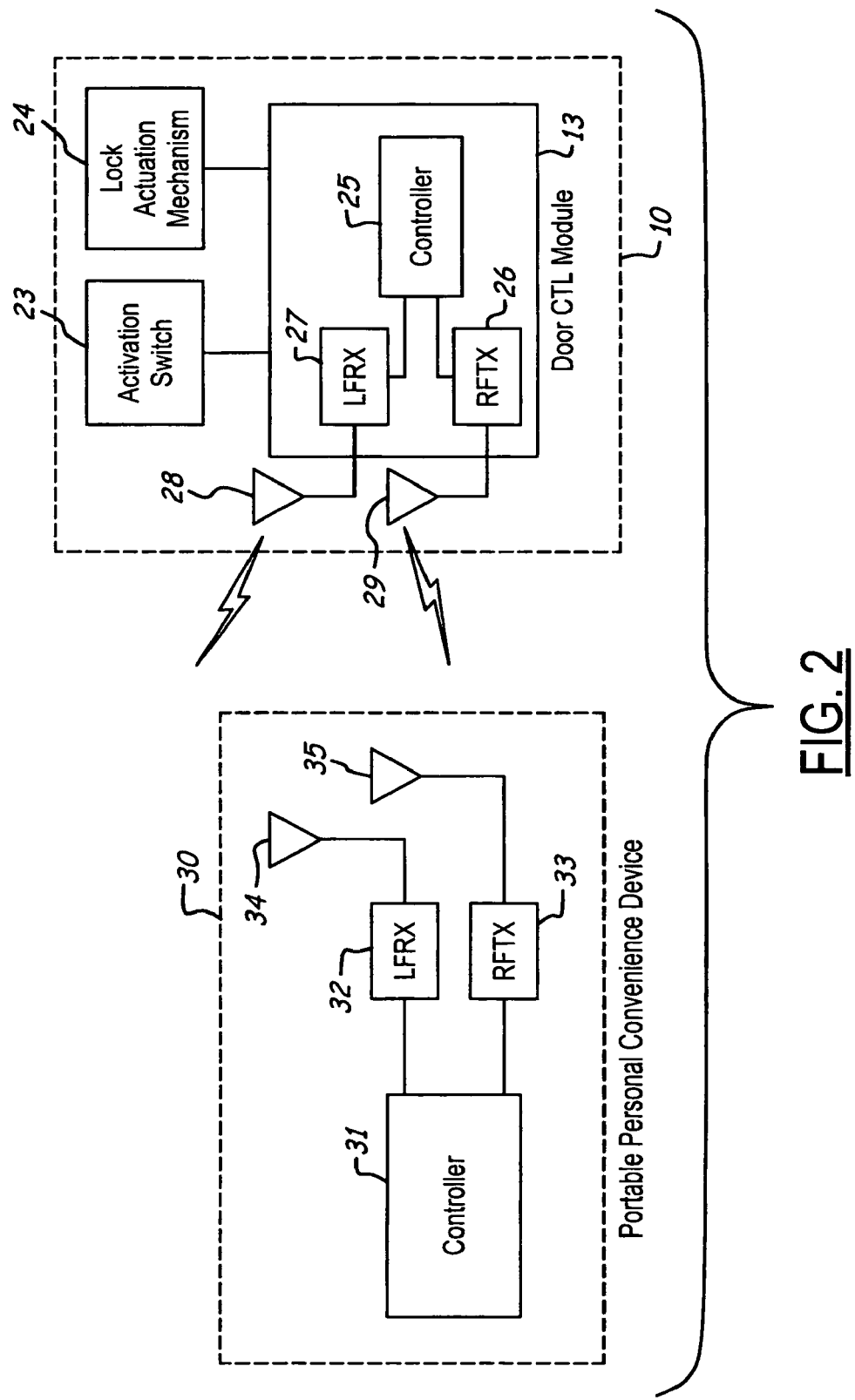
FIG. 2 is a block diagram showing a portable personal convenience device and a vehicle passive entry electronic control module of the present invention.

The passive entry system is shown in greater detail in FIG. 2. The electronic control module 13 disposed within the vehicle 10 includes a controller 25 for controlling the transmission and processing of the input/output signals to and from the electronic control module 13. The controller 25 may include memory containing software code that is executable by the controller 25. Other memory devices (not shown) such as an erasable programmable read-only memory (EPROM) may be included for storing other data if additional memory or unique programming is required.

The electronic control module 13 includes a low frequency transmitter (LFTX) 27 connected to a low frequency transmitting antenna 28 for transmitting low frequency signals generated by a user-carried device. The electronic module 13 further includes a high frequency receiver (RFRX) 26 connected to a high frequency receiving antenna 29 for receiving high frequency signals. The electronic control module is connected to the activation switch 23 for determining when a user is accessing the vehicle 10 via the door handle 21. When the user lifts the door handle 21, the activation switch 23 senses the presence of the user attempting to access the transportation vehicle 10. The electronic control module 13, in response to the signal received from the activation switch 23, transmits a low frequency passive entry interrogating signal via the LFTX 27 and low frequency transmitting antenna 28 to a portable personal convenience device 30 that is carried by a user.

The portable personal convenience device 30 includes a low frequency receiver (LFRX) 32 and a low frequency receiving antenna 34 for receiving the low frequency passive entry interrogating signal from the LFTX 27. Upon receiving the interrogating signal, a controller 31 of the portable personal communication device 30 determines if the interrogating signal is valid such that the interrogating signal matches a code stored in the controller 31. If the interrogating signal is valid, then the portable personal convenience device 30 broadcasts a response signal via a high frequency transmitter (RFTX) 33 and the high frequency transmitting antenna 35 to the electronic control module 13. The response signal includes an encrypted or rolling identification code to deter theft or electronic eavesdropping of the response signal. The electronic control module 13 receives the response signal via the high frequency receiving antenna 29 and the RFRX 26. In alternative embodiments, a transceiver may be used in place of device having a respective transmitter and a respective receiver.

The controller 25 of the electronic control module 13 processes the response signal to determine if the response signal matches the identification code stored in the memory of the controller 25. If so, then the electronic control module 13 outputs a control signal to a vehicle door security mechanism such as the door lock actuation mechanism 24 for unlocking the vehicle door 21. As a result, the vehicle door 21 is automatically unlocked without the user having to actuate a remote keyless entry switch on a remote device or insert a key to open the vehicle door 21.

Figure 3:
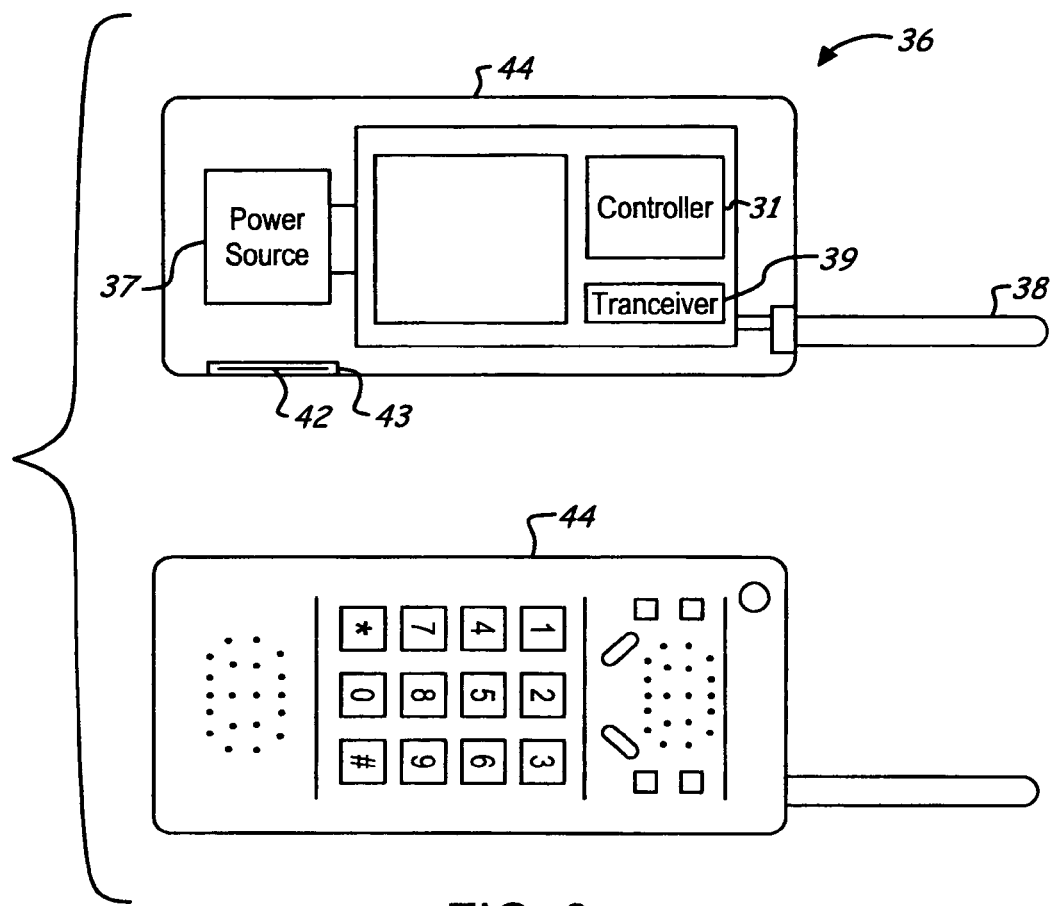
FIG. 3 is a portable personal convenience device according to a first preferred embodiment of the present invention.

A preferred embodiment of the portable personal convenience device is shown in FIG. 3. Such a device is one that is commonly carried with the user. This alleviates the need for adding a device to a key chain or carrying the additional device on the user. In the preferred embodiment, the portable personal convenience device 30 comprises a personal convenience means such as a cellular telephone 36. The cellular telephone 36 integrates the passive entry electronics for cooperatively actuating the door locking mechanism. A housing 44 (e.g., telephone casing) conceals the passive entry device along with the electronic components for the cellular telephone 36. The cellular telephone 36 is a personal device which is commonly carried on the user. In addition, since the cellular telephone 36 is a wireless communication device, one or more of the electronic components within the cellular telephone 36 may be cooperatively used to perform the wireless signal broadcast required for a remote passive entry device as opposed to utilizing duplicate electrical components for a variety independent functions.

The electronic components in the cellular telephone 36 that are cooperatively utilized with the passive entry system include a controller 31, a transceiver 39, an antenna 38, and a power supply 37. The controller 31 of the cellular telephone 36 typically controls the cellular telephone's transceiver for broadcasting a wireless communication signal. The controller 31 may further be used to control the reception of an interrogating signal and the transmission of the response signal to the electronic control module 13. The antenna 38 is utilized for converting the incoming electromagnetic fields into an AC current of the same frequency and for converting an AC current at a specific frequency into an outgoing electromagnetic field at the same frequency for both the cellular and passive entry communication signals. The transceiver 39 (or individual transmitter and receiver) transmits and receives the wireless cellular signals as well as the interrogating and response signals of the passive entry system.

In the preferred embodiment, a power source 37 of the cellular telephone 36 may be used to power all devices within the portable personal convenience device 30. This includes the controller 31, the transceiver 39 and other drivers required for operation, and other cellular electronics for operating cellular telephone 36. In alternative embodiments, separate controllers, power supplies, or transceivers may be used to independently operate the wireless cellular phone and the passive entry electronic components.

In yet another preferred embodiment, the portal personal convenience device 30 (e.g., cellular telephone) may include an expansion slot 43 for receiving a plug-in module 42. The plug-in module 42 when inserted in the expansion slot 43 receives electrical power from the personal convenience means. The electrical power may be provided from a direct electric connection to the power supply of the personal convenience means. In an alternative embodiment, the electrical power may be provided by a passive induced electrical field. The plug-in module 42 includes an algorithm for performing a vehicle specific passive entry function. Vehicle specific passive entry functions include a vehicle unlock function, an engine start function, and an immobilization function. The plug-in module 42 may be used among various portable personal convenience devices. With the use of the plug-in module 42, the specific programming software particular to a vehicle does not need to be fixed to the portable personal convenience devices, rather the plug-in module 42 may be interchangeable between portable devices. For example, a cellular phone can be manufactured without the user specific software and data that is specific to a specific user vehicle. If the user purchases a new phone, the user may transfer the software and other related data via the plug-in module 42 to a next cellular phone. Furthermore, the plug-in module 42 may include a plurality of identification codes and messaging protocols for accessing more than one transportation vehicle.

Figure 4:
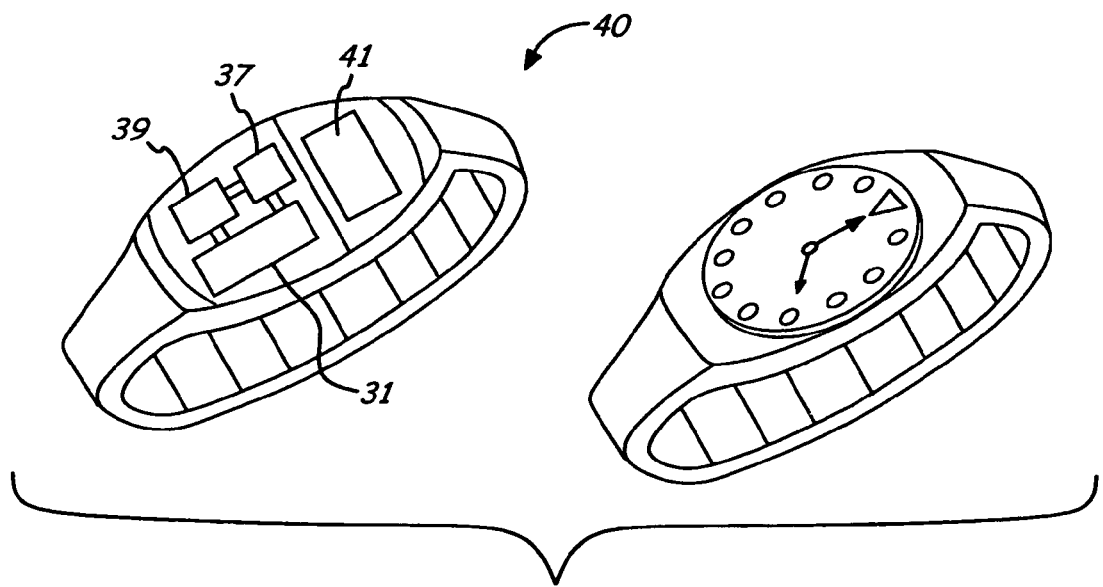
FIG. 4 is a portable personal convenience device according to a second preferred embodiment of the present invention.

FIG. 4 illustrates a non-electronic device integrating the passive entry components for passive entry control. A wristwatch, shown generally at 40, includes non-electrical components for operating the time function of the watch. The timing module, shown generally at 41, includes components such a spring, oscillating mass, and gears to drive timing hands on a numerated dial. The electrical components required for passive entry include the power source 37, the controller 31 and the transceiver 39. In alternative embodiments, a digital clock may be utilized as opposed to a wind-up watch. A battery is used as a power source for providing power to the electrical components associated with the digital timing controls and display. The battery may be utilized to power both the digital clock and the passive entry electrical components. In other preferred embodiments, the personal convenience means may include personal communication devices such as pagers or other electronic devices such as a PDA, a memory stick, and a fuel pass device.

Figure 5:
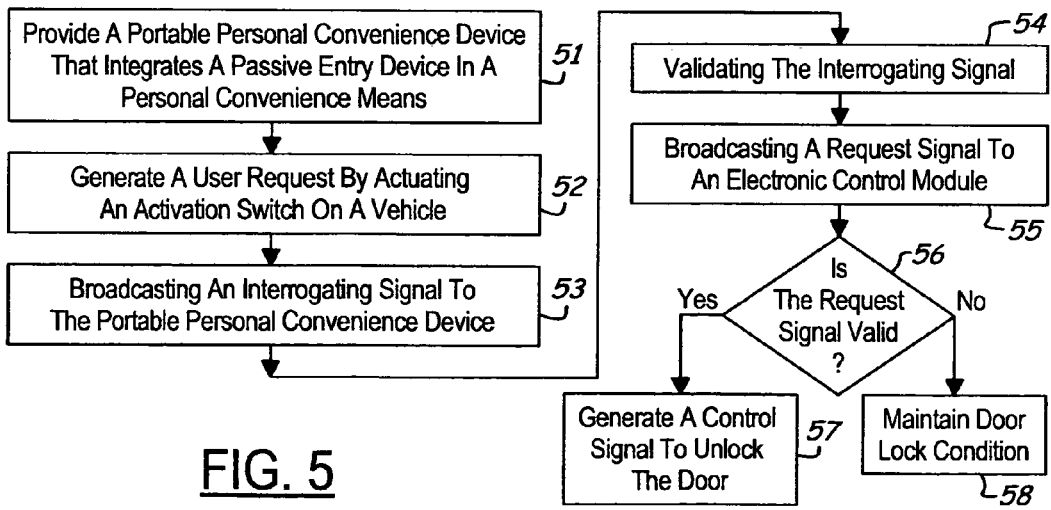
FIG. 5 is a flowchart of a preferred embodiment for a passive entry system of the present invention.

A preferred method for operating a passive entry system using a portable personal convenience device is shown in FIG. 5. A portable personal convenience device is provided that integrates a personal convenience means that performs a non-transportation related function such as a cellular telephone with a remote passive entry device in step 51. In step 52, a user generates a user request by actuating an activation switch on the vehicle such as a door handle. In step 53, an interrogating signal is automatically provided to a receiver within the portable personal convenience device in response to the actuation of the activation switch. In step 54, the interrogating signal is validated by the controller within the portable personal convenience device. In step 54, the controller of the portable personal convenience device controls the broadcast of a response signal to an electronic control module via a transmitter.

In step 55, the electronic control module matches the response signal with the identification code stored in memory. In step 56, a determination is made whether the response signal is valid. In step 57, if a determination is made that the response signal is valid, then the electronic control module generates a control signal to the door lock activation mechanism for unlocking the vehicle door (or other passive function such as passive engine starting or trunk unlatch). In step 58, if a determination is made that the response signal is not valid, then the door lock mechanism lock activation mechanism remains locked.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A portable personal convenience device carried by a person having access to a transportation vehicle comprising:
   personal convenience means for performing a non-transportation related convenience function, said personal convenience means further including an expansion slot; and
   a passive entry device integrated within said personal convenience means and adapted to interact with said transportation vehicle for passively gaining access thereto, said passive entry device comprising:
   a receiver for receiving an interrogating signal from an electronic control module in a vehicle;
   a transmitter for broadcasting a response signal to said electronic control module; and
   a controller for controlling the transfer of said response signal to said electronic control module in response to a validity of said interrogating signal;
   an interchangeable plug-in module received in said expansion slot for receiving electrical power from said personal convenience means, wherein said plug-in module includes an algorithm for performing passive-entry vehicle functions, and wherein said plug-in module includes a plurality of identification codes and messaging protocols for accessing more than one transportation vehicle.

2. The portable personal convenience device of claim 1 further comprising a housing for said personal convenience means, said housing concealing said passive entry device therein.

3. The portable personal convenience device of claim 1 wherein said personal convenience means comprises a personal wireless communication device.

4. The portable personal convenience device of claim 3 wherein said personal wireless communication device is one of a cell phone or a pager.

5. The portable personal convenience device of claim 1 wherein said personal convenience means is one of a personal digital assistant, a watch, a fuel pass device, or a memory stick.

6. The portable personal convenience device of claim 1 wherein said controller further controls said non-transportation related convenience function.

7. A method of operating a passive entry system using a portable personal convenience device for gaining access to a specific transportation vehicle, said method comprising the steps of:
   providing an expansion slot and an interchangeable plug-in module in said portable personal convenience device, said expansion slot receiving said interchangeable plug-in module which receives electrical power from said portable personal convenience device, said plug-in module including an algorithm for performing passive-entry vehicle functions, said plug-in module further including a plurality of identification codes and messaging protocols for accessing more than one transportation vehicle;
   concealing a remote passive entry device within a personal convenience means housing;
   detecting a user request for a passive entry function to said transportation vehicle;
   broadcasting an interrogation signal to a broadcast region exterior to said transportation vehicle;
   receiving said interrogation signal in said portable personal convenience device;
   determining whether said interrogation signal is valid;
   broadcasting a response signal to an electronic control module in response to said validity of said interrogation signal;
   determining whether said response signal is valid; and
   transmitting a control signal to a vehicle safety mechanism for activating one of a plurality of passive entry functions to said vehicle in response to said validity of said response signal.

8. The method of claim 7 wherein said plurality of passive entry functions includes a vehicle unlock function, an engine start function, and an immobilization function.

9. The method of claim 7 wherein said step of detecting a user request includes detecting contact with a vehicle door handle.

10. The method of claim 7 wherein said plug-in module is interchangeable among a plurality of portable personal convenience devices.

11. The method of claim 7 wherein said step of transmitting said control signal to vehicle safety mechanism further comprises unlocking said vehicle door lock.

12. A combined personal convenience and passive entry device adapted for use with a transportation vehicle, said combined personal convenience and passive entry device comprising:
 a housing;
 a personal convenience device supported within said housing and adapted to perform a non-transportation related convenience function; and
 a passive entry device supported within said housing and including a receiver adapted to receive an interrogating signal from a transportation vehicle, a transmitter adapted to broadcast a response signal to the transportation vehicle, and a controller that receives said interrogating signal from said receiver, determines whether said interrogating signal is valid, and causes said transmitter to broadcast said response signal when said interrogating signal is valid.

13. The combined personal convenience and passive entry device defined in claim 12 further including an electrical power source supported within said housing, and wherein said personal convenience device and said passive entry device are connected to receive electrical power from said electrical power source.

14. The combined personal convenience and passive entry device defined in claim 12 wherein said personal convenience device includes an expansion slot, and wherein said passive entry device is received in said expansion slot.

15. The combined personal convenience and passive entry device defined in claim 14 wherein said passive entry device includes a plug-in module that is received in said expansion slot.

16. The combined personal convenience and passive entry device defined in claim 12 wherein said passive entry device includes an algorithm for performing passive entry vehicle functions.

17. The combined personal convenience and passive entry device defined in claim 12 wherein said passive entry device includes a plurality of identification codes and messaging protocols for accessing more than one transportation vehicle.

* * * * *